(12) United States Patent
Zhang

(10) Patent No.: US 9,867,076 B2
(45) Date of Patent: Jan. 9, 2018

(54) PCRF APPARATUS AND TRAFFIC HANDLING METHOD FOR USE IN PCRF

(71) Applicant: Telefonaktiebolaget L M Ericsson (publ), Stockholm (SE)

(72) Inventor: Shunliang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/438,897

(22) PCT Filed: Nov. 8, 2012

(86) PCT No.: PCT/CN2012/084306
§ 371 (c)(1),
(2) Date: Apr. 28, 2015

(87) PCT Pub. No.: WO2014/071590
PCT Pub. Date: May 15, 2014

(65) Prior Publication Data
US 2015/0245238 A1    Aug. 27, 2015

(51) Int. Cl.
*H04L 12/26* (2006.01)
*H04L 1/00* (2006.01)
(Continued)

(52) U.S. Cl.
CPC ......... *H04W 28/0215* (2013.01); *H04L 47/11* (2013.01); *H04L 47/12* (2013.01);
(Continued)

(58) Field of Classification Search
None
See application file for complete search history.

(56) References Cited

U.S. PATENT DOCUMENTS

| 2007/0081543 A1* | 4/2007 | Brenes | H04L 43/0888 370/401 |
| 2011/0022702 A1* | 1/2011 | Riley | H04L 12/14 709/224 |

(Continued)

FOREIGN PATENT DOCUMENTS

| CN | 101370265 | 2/2009 |
| CN | 102075898 | 5/2011 |

(Continued)

OTHER PUBLICATIONS

PCT Notification of Transmittal of the International Search Report and the Written Opinion of the International Searching Authority, or the Declaration for International application No. PCT/CN2012/084306, dated Aug. 1, 2013.

(Continued)

*Primary Examiner* — Edan Orgad
*Assistant Examiner* — Rebecca Song
(74) *Attorney, Agent, or Firm* — Baker Botts, LLP

(57) ABSTRACT

The present disclosure relates to a traffic handling method (100) for use in a Policy and Charging Rules Function (PCRF). The method includes: receiving information about load status of a Radio Access Network (RAN) area (110); obtaining information about traffic type of one or more User Equipments (UEs) associated with said RAN area (120); generating a traffic handling policy based on the received information about load status of said RAN area and the obtained information about traffic type (130); and sending the traffic handling policy to a gateway node in the core network, for applying it to said one or more UEs associated with said RAN area (140).

10 Claims, 5 Drawing Sheets

(51) Int. Cl.
*H04W 28/02* (2009.01)
*H04W 28/16* (2009.01)
*H04L 12/859* (2013.01)
*H04W 28/12* (2009.01)
*H04L 12/801* (2013.01)

(52) U.S. Cl.
CPC ..... *H04L 47/2475* (2013.01); *H04W 28/0247* (2013.01); *H04W 28/0284* (2013.01); *H04W 28/12* (2013.01); *H04W 28/16* (2013.01)

(56) References Cited

U.S. PATENT DOCUMENTS

| | | | |
|---|---|---|---|
| 2011/0158090 A1* | 6/2011 | Riley | H04L 12/14 370/230 |
| 2012/0052866 A1 | 3/2012 | Froehlich et al. | |
| 2012/0257499 A1 | 10/2012 | Chatterjee et al. | |
| 2013/0176908 A1* | 7/2013 | Baniel | H04L 12/1407 370/259 |
| 2014/0022904 A1* | 1/2014 | Ahmad | H04W 28/0289 370/235 |
| 2014/0112138 A1* | 4/2014 | Kahn | H04L 43/062 370/235 |
| 2015/0117204 A1* | 4/2015 | Lott | H04L 45/306 370/235 |

FOREIGN PATENT DOCUMENTS

| | | |
|---|---|---|
| CN | 102752709 | 10/2012 |
| EP | 1 798 914 A1 | 6/2007 |
| EP | 2 200 362 A1 | 6/2010 |

OTHER PUBLICATIONS

"BlueStreaming: Towards Power-Efficient Internet P2P Streaming to Mobile Devices" by Yao Liu et al., dated 2011.
European Patent Office, Communication, Supplementary European Search Report, Application No. 12887981.4, 7 pages, received by Baker Botts dated Jun. 14, 2016.

\* cited by examiner

PCRF APPARATUS AND TRAFFIC HANDLING METHOD FOR USE IN PCRF

PRIORITY

This nonprovisional application is a U.S. National Stage Filing under 35 U.S.C. §371 of International Patent Application Serial No. PCT/CN2012/084306, filed Nov. 8, 2012, and entitled "PCRF APPARATUS AND TRAFFIC HANDLING METHOD FOR USE IN PCR."

TECHNICAL FIELD

The disclosure generally relates to communication systems, and more particularly, to a Policy and Charging Rules Function (PCRF) apparatus and a traffic handling method for use in PCRF.

BACKGROUND

Unless otherwise indicated herein, the approaches described in this section are not prior art to the claims in this disclosure and are not admitted to be prior art by inclusion in this section.

In order to handle policy control and charging, the 3rd Generation Partnership Project (3GPP) has in TS 23.203 specified a policy and charging control (PCC) functionality encompassing the two main functions:

Flow Based Charging, including charging control and online credit control; and

Policy control (e.g., gating control, Quality of Service (QoS) control, QoS signaling, etc.)

The PCC functionality is comprised by the functions of the Policy and Charging Enforcement Function (PCEF), the Bearer Binding and Event Reporting Function (BBERF), the Policy and Charging Rules Function (PCRF), the Application Function (AF), the Online Charging System (OCS), the Offline Charging System (OFCS) and the Subscription Profile Repository (SPR) or the User Data Repository (UDR).

The PCRF is the part of the network architecture that aggregates information to and from the network supporting the creation of rules and then makes handling policy decisions for users active on the network.

For most kinds of applications over mobile networks, the PCRF generates traffic handling policies based on application related information, subscription information of users, information from charging system, pre-configured policy information of the operator, and the other static information. This may reduce the experience of network service to users.

So a new mechanism is needed for generating traffic handling policies with respect to applications over a mobile network.

SUMMARY

According to the present disclosure, a traffic handling scheme is introduced in mobile networks to dynamically provide a traffic handling policy.

In a first aspect of the present disclosure, there is provided a traffic handling method for use in a PCRF of a core network. The traffic handling method includes: receiving information about load status of a Radio Access Network (RAN) area; obtaining information about traffic type of one or more User Equipments (UEs) associated with the RAN area; generating a traffic handling policy based on the received information about load status of the RAN area and the obtained information about traffic type; and sending the traffic handling policy to a gateway node of the core network, for applying it to the one or more UEs associated with the RAN area.

In a second aspect of the present disclosure, there is provided a PCRF apparatus of a core network for traffic handling. The PCRF apparatus includes: a receiving unit configured to receive information about load status of a Radio Access Network (RAN) area; an obtaining unit configured to obtain receive information about traffic type of one or more UEs associated with the RAN area; a generating unit configured to generate a traffic handling policy based on the received information about load status of the RAN area and the obtained information about traffic type; and a sending unit configured to send the traffic handling policy to a gateway node of the core network, for applying it to the one or more UEs associated with the RAN area.

By generating the traffic handling policy dynamically based on the varying RAN load, the present disclosure can utilize radio network resource more efficiently.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Figure 1:
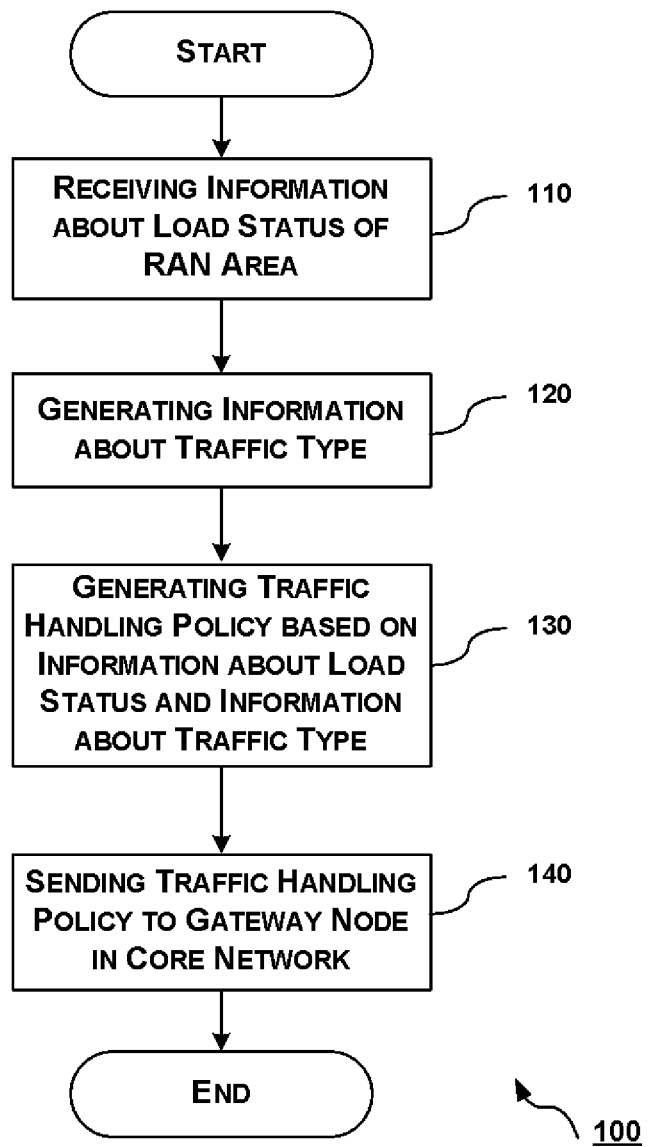
FIG. 1 shows a flowchart of a traffic handling method 100 for use in a PCRF according to an embodiment of the present disclosure.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

Hereinafter, an application may refer to a type of traffic. As such, in the present disclosure, the term "traffic" may be used equivalently as the term "application".

FIG. 1 shows a flowchart of a traffic handling method 100 for use in a PCRF of a core network according to an embodiment of the present disclosure.

As shown in FIG. 1, the method 100 beings with step S110. In step S110, information about load status of a Radio Access Network (RAN) area is received.

It should be noted that the RAN area herein may be served by a base station of the core network and may refer to one or more cells. Moreover, the one or more UEs associated with the RAN area may either refer to UEs located in the RAN area or UEs served by the base station.

As an example, the information about load status of the RAN area may come from the base station and may be forwarded by a gateway node of the core network. In this case the base station may monitor the load status of the RAN area, and upon the change of the load status, report and/or update the information about the load status to the gateway node.

As another example, the information about load status of the RAN area may include at least one of:
- a hardware overload indicator, which indicates if RAN hardware is overloaded or not;
- a Transport Network Layer (TNL) overload indicator, which indicates if backhaul connection between the RAN and the core network is overloaded or not;
- a cell uplink user plane overload indicator, which indicates if uplink user plane is overloaded or not;
- a cell downlink user plane overload indicator, which indicates if downlink user plane is overloaded or not;
- a cell uplink control plane overload indicator, which indicates if uplink control plane is overloaded or not; and
- a cell downlink control plane overload indicator, which indicates if downlink control plane is overloaded or not.

For example, in Long Term Evolution (LTE), the TNL overload indicator may be a S1 TNL overload indicator, which indicates if backhaul connection between radio access network and core network is overloaded or not. Alternatively, the TNL overload indicator may be an Iu or Iub TNL overload indicator, which indicates if backhaul connection between radio access network and core network is overloaded or not.

It should be noted that the term "overloaded" may be equivalently used with the term "congested" in the present disclosure.

In step S120, information about traffic type of one or more UEs associated with the RAN area is obtained. Here, the information about traffic type may indicate one or more applications that are running on the one or more UEs.

Preferably, the information about traffic type may be determined by traffic type detection on a gateway node of the core network. For example, the traffic type detection may be enabled always or only when a RAN overload occurs in the RAN area. That is, the traffic type detection may be disabled when there is no RAN overload in the RAN area. As such, the traffic type detection may be disabled when it is unnecessary, e.g., when sufficient network resource is available to take any traffic. This may reduce the load of Deep Packet Inspection (DPI).

In step S130, a traffic handling policy is generated based on the received information about load status of the RAN area and the obtained information about traffic type.

As an alternative example, the traffic handling policy may include:
CONDITION: the received information about load status of the RAN area indicates that a RAN overload occurs in the RAN area,
ACTIONS: at least one of:
blocking one or more types of traffic for the one or more UEs;
decreasing a transportation rate (usually, the maximum bit rate) of one or more types of traffic for the one or more UEs;
changing the charging rules applied to one or more types of traffic for the one or more UEs;
degrading handling priority of one or more types of traffic for the one or more UEs; and
decreasing bandwidth resource provision to one or more types of traffic for said one or more UEs, for example, by enabling compression or transcoding mechanism of one or more types of traffic for the one or more UEs.

For example, the base station may detect whether the load status of the RAN area exceeds a predefined threshold so as to determine the "CONDITION". If yes, it is determined that there is a RAN overload occurring, that is "CONDITION" is satisfied. In such a case, for example, the information about traffic type may be received from the gateway node.

As another alternative example, the traffic handling policy may include:
CONDITION: the received information about load status of the RAN area indicates that a RAN overload disappears in the RAN area,
ACTIONS: at least one of:
de-blocking one or more types of traffic for the one or more UEs;
increasing a transportation rate (usually, the maximum bit rate) of one or more types of traffic for the one or more UEs;
changing the charging rules applied to one or more types of traffic for the one or more UEs;
upgrading handling priority of one or more types of traffic for the one or more UEs; and
increasing bandwidth resource provision to one or more types of traffic for the one or more UEs, for example by disabling compression or transcoding of one or more types of traffic for the one or more UEs.

For example, after the RAN overload has occurred, the base station may detect whether the load status of the RAN area is lower than a predefined threshold so as to determine the "CONDITION". If yes, it is determined that the RAN overload disappears, that is "CONDITION" is satisfied. In such a case, for example, the information about traffic type may be obtained from the previously stored information. For example, the information about traffic type may be that received from the gateway node when the RAN overload previously occurs.

With different traffic handling policies generated depending on varying RAN loads, the present disclosure may make the operator monetize network resource flexibly based on the radio network load status.

In step S140, the traffic handling policy is sent to the gateway node, for applying it to the one or more UEs associated with the RAN area.

For example, the traffic handing policy may be sent to the PCEF in the gateway node, which then enforces the traffic handing policy to the related UEs. The PCEF may perform the P2P traffic handling policy by itself, or may instruct the base station to perform the P2P traffic handling policy, depending on the specific traffic requirements.

As a non-limiting example, the traffic type may include at least one of: P2P application; Voice over IP (VoIP); instant messaging; Hypertext Transfer Protocol (HTTP) based streaming; blog or microblog application; gaming; APPlication (APP) download; or social networking application. It will be appreciated that the present disclosed may be also applied to any other appropriate types of traffics.

In the following, the present application will be described in detail by taking P2P application over mobile networks as an example. It should be noted that the present disclosure is also applicable to other types of traffic over mobile network, such as Voice over IP, instant messaging, microblog application, blog application, etc.

Currently, in addition to some fixed networks like IP backbone networks, P2P applications are popular in some mobile networks such as GERAN, UTRAN, EUTRAN, CMDA2000, WLAN, etc. To avoid the negative impact of P2P traffic to service availability of other users, a specific solution has been taken. The general idea of the solution is to detect P2P traffic at certain network device such as a router or a Gateway (GW) device. In case the P2P traffic is detected, it is throttled according to some preconfigured P2P traffic handling policy. However, there are some shortcomings for this solution:

1. Dynamic radio access network status information is not taken into account. In contrast to fixed access in IP backbone network, the radio link capacity is more dynamic and restricted. Usually, radio link is the potential bottle neck of the whole system. The potential problems lie in:
   if the radio network does not has heavy load and P2P throttling policy is too aggressive, RAN resource may not be fully used; and
   if the radio network has heavy load and the P2P throttling policy is less aggressive, RAN resource may be over-consumed.
2. In the prior art, it is needed to detect P2P traffic for all users at all times, which would significantly increase the load of Core Network (CN) device (thereby needing more DPI resource). Because, detecting P2P applications is quite resource consuming. P2P applications could not be detected just based on one or two IP packets. Instead, a lot of IP packets from many users need to be analyzed to identify P2P applications based on group behaviors (e.g., heuristic service/application detection).

To solve at least one of these problems, the following embodiments propose an adaptive mechanism on handling P2P traffic so as to improve service availability to other users.

Figure 2:
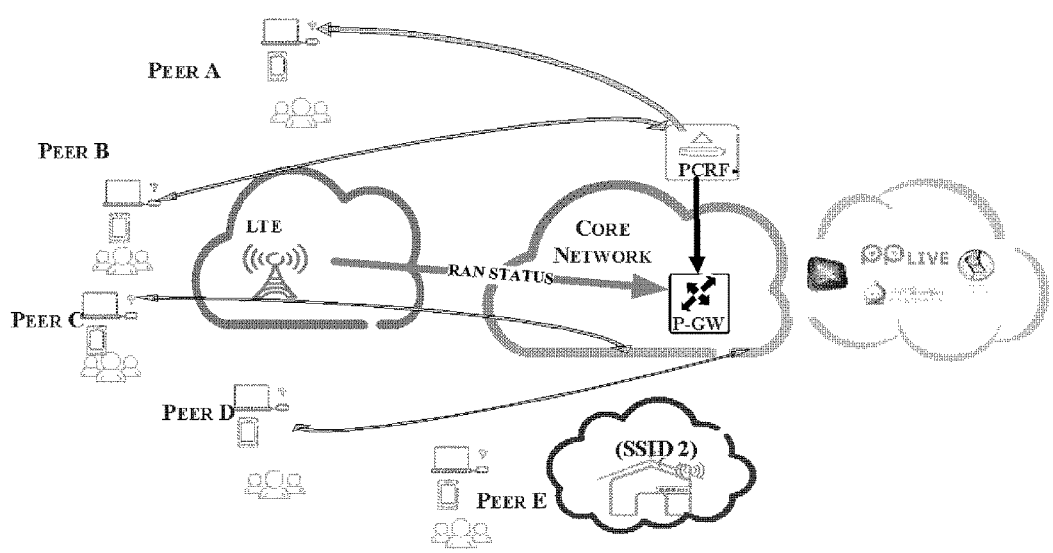
FIG. 2 illustrates a Peer to Peer (P2P) streaming system where the present disclosure may be applied.

FIG. 2 illustrates a P2P streaming system where the present disclosure may be applied. In FIG. 2, PPlive streaming is illustrated as an example. It will be appreciated that other P2P applications such as PPstream may be also applicable.

As shown in FIG. 2, the P2P steaming system includes Peer A, Peer B, Peer C, Peer D and Peer E, which may be involved in P2P applications. Although FIG. 2 is exemplified in the context of five P2P peers, any other number of P2P peers may be also applied here.

As shown in FIG. 2, the RAN element like a base station (e.g., enhanced-Node B (eNB) in this example)/RNC may be enhanced to report RAN load status information to the CN element like P-GW (Public Data Network "PDN" Gate-Way) to make the CN aware if there is some problem happened in the RAN or not. In case there are some problems happened, P-GW initiates traffic detection on users located in problematic RAN areas. If there is a RAN overload (e.g., potential problematic services/applications) occurring, P-GW interacts with the PCRF to ask for a traffic handling policy by providing RAN load status information and related service/application information, and then handles P2P traffic from/to users located in certain RAN areas accordingly. The PCRF is enhanced to dynamically generate a traffic handling policy based on the reported RAN load status information.

Although FIG. 2 is exemplified in the context of LTE, the similar case happens in 3GPP such as WCDMA, where GGSN acts instead of the P-GW and SGSN acts instead of MME.

Figure 3:
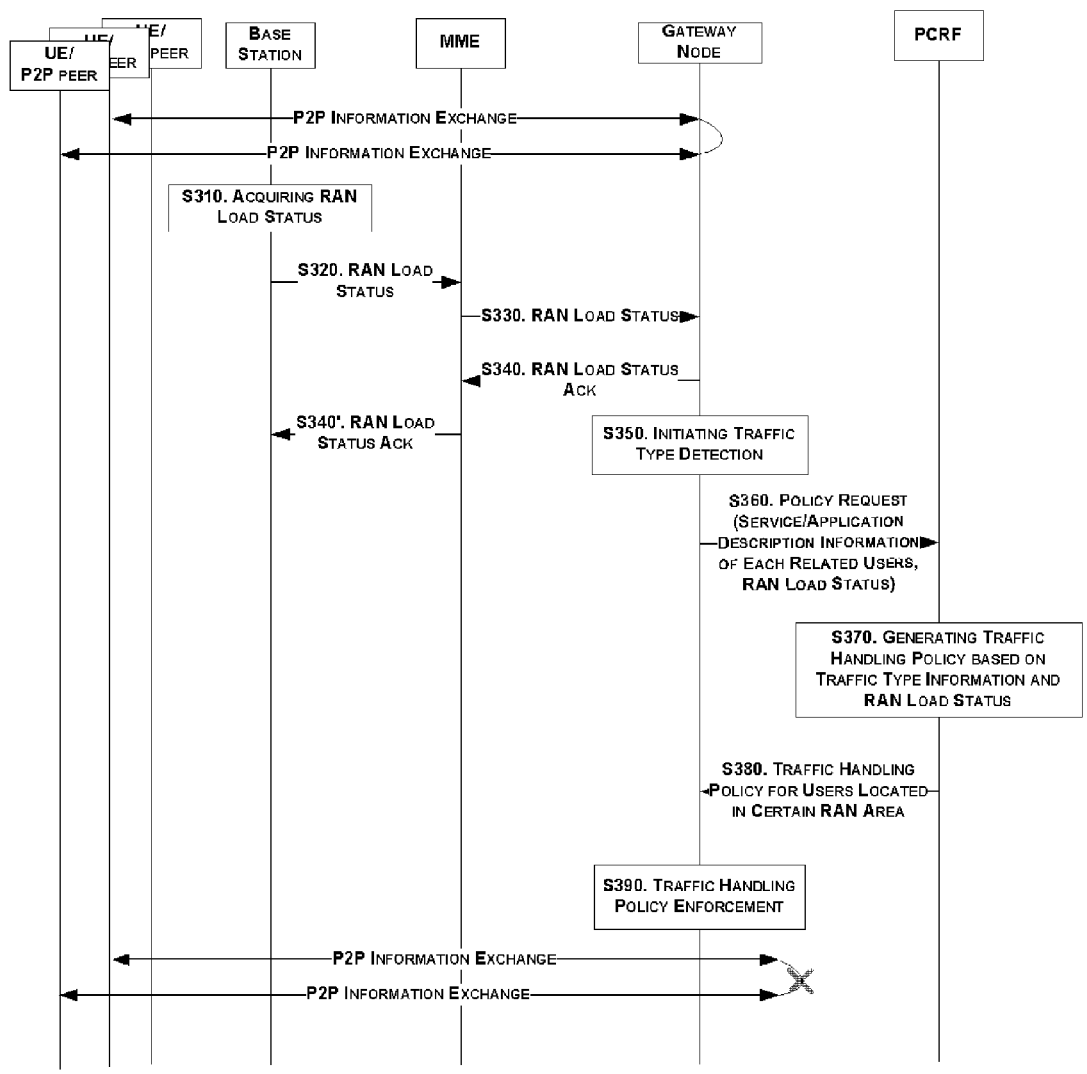
FIG. 3 shows a sequence diagram of a traffic handling method according to a first example of the present disclosure.

FIG. 3 illustrates a sequence diagram of a traffic handling method according to a first example of the present disclosure, where there is initially P2P information exchange between UEs served by the base station and P-GW. Although FIG. 3 is illustrated in the context of one base station, any other number of base stations may be also applicable.

In step S310, the base station may acquire information about RAN load status, such as hardware (e.g., scheduler) load, TNL load (e.g., S1 TNL load in EPS, or Iu and Iub TNL load in WCDMA), cell uplink/downlink user plane load, cell uplink/downlink control plane load, etc. The RAN load status may be measured by the base station, or may be obtained by the base station in any other appropriate manners. For example, the base station may detect whether any one of the RAN load, such as the hardware load, exceeds a predefined threshold. If yes, it is determined that there is a RAN overload occurring. It should be noted that different kinds of RAN load may have different predetermined thresholds. In some situations, it could define the RAN overload occurring based on two or more kinds of RAN load.

In step S320, a RAN overload occurs (e.g., the RAN load status exceeds the predefined threshold), for example, the scheduler is overloaded, or C-plane resource is over consumed, or Cell is congested in uplink, or any combination of them, the base station may inform the core network that the overload happens at RAN by, for example, sending a message to Mobility Management Entity (MME) (which may be SGSN in some other situations).

The message may include at least one of: a hardware overload indicator indicating whether RAN hardware is overloaded or not; a TNL overload indicator, which indicates if backhaul connection between the RAN and the core network is overloaded or not; a cell uplink user plane overload indicator indicating if uplink user plane is overloaded or not; a cell downlink user plane overload indicator indicating if downlink user plane is overloaded or not; a cell uplink control plane overload indicator indicating if uplink control plane is overloaded or not; and a cell downlink control plane overload indicator indicating if downlink control plane is overloaded or not. For example, if the RAN hardware is overloaded, the hardware overload indicator may be set to be 1, otherwise 0. The similar examples may be applied to the remaining indicators mentioned above.

For example, in LTE, the TNL overload indicator may be a S1 TNL overload indicator, which indicates if backhaul connection between radio access network and core network is overloaded. Alternatively, in 3GPP, the TNL overload indicator may be an Iu or Iub TNL overload indicator, which indicates if backhaul connection between radio access network and core network is overloaded or not.

Any other appropriate information may be also sent along with the message. For example, a UE ID list of UEs associated with the RAN area (i.e., the UEs served by the base station, such as Peers A to D as shown in FIG. 2) may be also informed to the core network.

In step S330, the MME may forward the message to the P-GW.

As a response, the P-GW may send an acknowledge message (i.e., ACK) to the MME in step S340.

The MME in turn sends an acknowledge message to the base station to acknowledge the receipt of the message in step S340'.

Upon receiving the message, the P-GW knows that some overload problems happen in the RAN area (e.g., indicated by one or more cell IDs). Then, the P-GW may initiate a problematic application (it is P2P application in this case, however, it may be any other types of traffics that may lead to overload) detection of related UEs located in the RAN areas, i.e., determining the information about the traffic type by means of traffic type detection (step S350). Here, the information about the traffic type may indicate one or more applications that are running on the related UEs.

It should be noted that the step 350 is optional. For example, the traffic type detection may be enabled always or only when a RAN overload occurs in the RAN area. As such, the traffic type detection may be disabled when it is unnecessary, e.g., when sufficient network resource is available to take any traffic. This may reduce the load of DPI device.

In step S360, when an overload (e.g., problematic service/application) is detected, for example, the base station determines that the load status of the RAN area exceeds a predefined threshold, the P-GW may send a policy report to the PCRF to request the PCRF to generate a new traffic handling polity for the detected problematic service/application. The policy request may include service/application description information of related UEs (also referred to as information about traffic type) and the RAN load status.

In step S370, the PCRF generates a P2P traffic handling policy based on the RAN load status and the information about traffic type. As an option, the generating may be further based on trouble shooting information, certain service/application related traffic regulation policy, and the any other appropriate information. During the generating, the PCRF may identify the specific traffic type to be handled based on the RAN load status and the information about traffic type contained in the policy request, as well as traffic attribute derived from the traffic type and the association between the traffic type and the RAN load status.

In step S380, the PCRF may send the generated P2P traffic handling policy to the P-GW, for applying it to the UEs associated with the RAN areas.

In step S390, the PCEF in the P-GW enforces the P2P traffic handling policy to certain users located in RAN area.

For example, one or more of the following actions may be taken for one or more UEs associated with the RAN area:
 the P2P application for said one or more UEs may be blocked;
 a transportation rate (usually, the maximum bit rate) of P2P application for said one or more UEs may be decreased;
 the charging rules applied to P2P application of traffic for said one or more UEs may be changed;
 handling priority of P2P application of traffic for said one or more UEs may be degraded; or
 bandwidth resource provision to P2P application for said one or more UEs may be decreased, for example, by enabling compression or transcoding mechanism of the P2P application.

As an example, when the PCRF receives from the gateway node a cell uplink user plane overload indicator indicating uplink user plane is overloaded, a cell uplink control plane overload indicator indicating uplink control plane is overloaded, and a cell downlink control plane overload indicator indicating downlink control plane is overloaded, and the information about the traffic type indicates P2P application and other applications like Web browsing, the PCRF may identify P2P application from one or more application for policy control based on specific characteristics of P2P application. For example, for the P2P application, there may be a large amount of uplink traffic due to content sharing from peers, and a lot of uplink and downlink control plane traffic due to a large amount of P2P signaling. By considering such characteristics of the P2P application under the RAN load status indicated by the received indicators, the PCRF may identify the P2P application, whose handling policy is to be adjusted. Then, the PCRF may generate a specific policy, such as decreasing the maximum uplink and downlink data rate of bearers carrying the P2P application-related traffic to and from UEs located in the RAN area that is overloaded.

As an another example, when the PCRF receives from the gateway node a cell uplink control plane overload indicator indicating uplink control plane is overloaded, a cell downlink control plane overload indicator indicating downlink control plane is overloaded, a cell uplink user plane overload indicator indicating uplink user plane becomes not overloaded or not, and a cell downlink user plane overload indicator indicating downlink user plane becomes not overloaded, and the information about the traffic type indicates Instant message application and other applications like Web browsing, the PCRF may identify Instant message application from one or more application for policy control based on specific characteristics of Instant message application. For example, for the Instant message application, there may be a lot of uplink and downlink control plane traffic due to a large amount of keep-live signaling exchanged among clients and server. By considering such characteristics of the Instant message application under the RAN load status indicated by the received indicators, the PCRF may identify the Instant message application, whose handling policy is to be adjusted. Then, the PCRF may generate specific policy, for example, downgrading the priority or changing the charging policy (such as increasing the tariff applied to the Instant message application) applied to bearers carrying the Instant message application-related traffic to and from UEs located in the RAN area that is overloaded.

In the above both examples, "considering" may refer to, for example, determining which application (s) has characteristics best matching with the RAN load status.

With different traffic handling policies generated depending on varying RAN loads, the present disclosure may make the operator monetize network resource flexibly based on the radio network load status.

Figure 4:
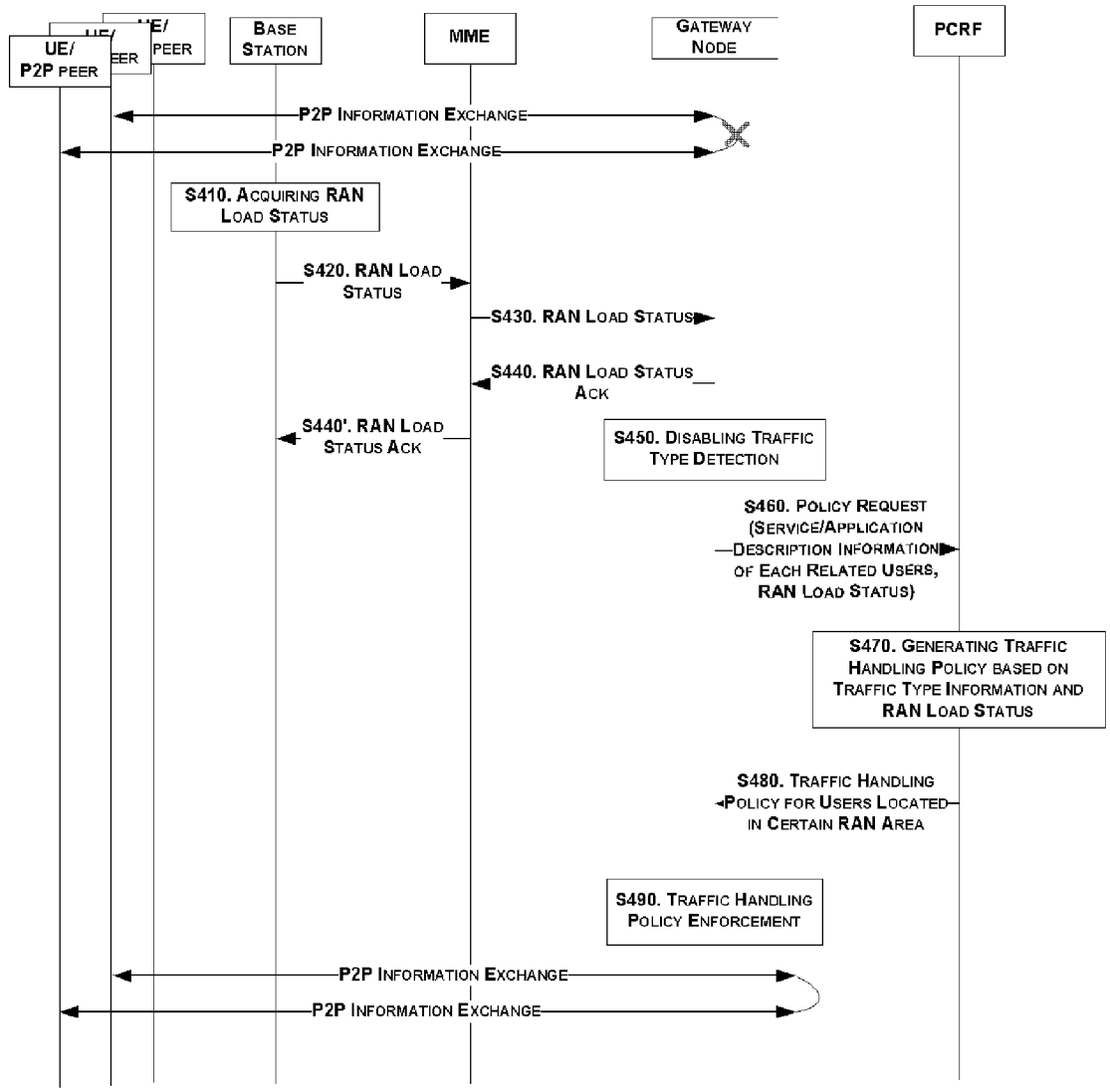
FIG. 4 shows a sequence diagram of a traffic handling method according to a second example of the present disclosure.

FIG. 4 illustrates a sequence diagram of a traffic handling method according to a second example of the present disclosure, where there is initially overload occurring at RAN.

In step S410, the base station may acquire information about RAN load status, such as hardware (e.g., scheduler) load, TNL load (e.g., S1 TNL load in LTE, or Iu and Iub TNL load in 3G network), cell uplink/downlink user plane load, cell uplink/downlink control plane load, etc. The RAN load status corresponds to the overload that has occurred. The RAN load status may be measured by the base station, or may be obtained by the base station in any other appropriate manners. For example, the base station may detect whether the RAN load is lower than a predefined threshold, and if yes, it is determined whether the RAN overload disappears. It should be noted that the predefined threshold here may be different from the predetermined threshold used for determining RAN overload occurring.

In step S420, when the RAN overload disappears (e.g., the RAN load status becomes lower than the predefined threshold), for example, the scheduler is not overloaded, and/or C-plane resource is not over consumed, and/or Cell is not congested in uplink, etc., the base station may inform the core network that the overload disappears at RAN by, for example, sending a message to MME (which may be SGSN in some other situations).

The message may include at least one of: a hardware overload indicator indicating whether RAN hardware is overloaded or not; a TNL overload indicator, which indicates if backhaul connection between the RAN and the core network is overloaded or not; a cell uplink user plane overload indicator indicating if uplink user plane is overloaded or not; a cell downlink user plane overload indicator indicating if downlink user plane is overloaded or not; a cell uplink control plane overload indicator indicating if uplink control plane is overloaded or not; and a cell downlink control plane overload indicator indicating if downlink control plane is overloaded or not. For example, if RAN hardware overload disappears, the hardware overload indicator may be set to be 0. The similar examples may be applied to the remaining indicators mentioned above.

For example, in LTE, the TNL overload indicator may be a S1 TNL overload indicator, which indicates if backhaul connection between radio access network and core network is overloaded. Alternatively, in 3G network, the TNL overload indicator may be an Iu or Iub TNL overload indicator, which indicates if backhaul connection between radio access network and core network is overloaded or not.

Any other appropriate information may be also sent along with the message. For example, a UE ID list of UEs associated with the RAN area (i.e., the UEs served by the base station, such as Peers A to D as shown in FIG. 2) may be also informed to the core network.

In step S430, the MME may forward the message to the P-GW.

As a response, the P-GW may send an acknowledge message (i.e., ACK) to the MME in step S440.

The MME in turn sends an acknowledge message to the base station to acknowledge the receipt of the message in step S440'.

Upon receiving the message, the P-GW knows that some or all overload problems have disappeared in the RAN area (e.g., indicated by one or more cell IDs). Then, the P-GW may stop P2P application detection function for related UEs located in the RAN areas, i.e., disabling traffic type detection that is used to detect the information about the traffic type (step S450). That is to say, the traffic type detection may be disabled when a RAN overload disappears in the RAN area. In this case, the PCRF may obtain the information about the traffic type, for example, from the previously stored information. For example, the PCRF may use the information about the traffic type received from the P-GW in step 370 of FIG. 3.

It should be noted that the step 450 is optional. For example, the traffic type detection may be enabled always or only when a RAN overload occurs in the RAN area. That is, the traffic type detection may be disabled when there is no RAN overload occurring in the RAN area. As such, the traffic type detection may be disabled when it is unnecessary, e.g., when sufficient network resource is available to take any traffic. This may reduce the load of DPI.

In step S460, when the P-GW is informed that the overload disappears, it may send a policy report to the PCRF to request the PCRF to generate a new traffic handling polity. The policy request may include service/application description information of related UEs (also referred to as information about traffic type) and the RAN load status.

In step S470, the PCRF generates a P2P traffic handling policy based on the RAN load status and the information about traffic type. As an option, the generating may be further based on trouble shooting information, certain service/application related traffic regulation policy, and the any other appropriate information. During the generating, the PCRF may identify the specific traffic type to be handled based on the RAN load status and the information about traffic type contained in the policy request, as well as traffic attribute derived from the traffic type and the association between the traffic type and the RAN load status.

For example, the PCRF may identify a specific application from one or more applications indicated by the information about the traffic type by considering specific characteristics of respective applications under the RAN load status. Still take P2P application as an example. For the P2P application, there may be a large amount of uplink traffic due to content sharing from peers, and a lot of uplink and downlink control plane traffic due to a large amount of P2P signaling. Then, the PCRF may identify the P2P application by considering such characteristics of the P2P application under the RAN load status. Here, "considering" may refer to, for example, determining which application (s) has characteristics best matching with the RAN load status.

In step S480, the PCRF may send the generated P2P traffic handling policy to the P-GW, for applying it to the UEs associated with the RAN areas.

In step S490, the PCEF in the P-GW may then enforce the P2P traffic handling policy to certain users located in the RAN areas. For example, the PCEF may perform the P2P traffic handling policy by itself, or may instruct the base station to perform the P2P traffic handling policy, depending on the specific traffic requirements.

For example, one or more of the following actions may be taken for one or more UEs associated with the RAN area:
P2P application for said one or more UEs may be de-blocked;
a transportation rate (usually, the maximum bit rate) of P2P application for said one or more UEs may be increased;
the charging rules applied to P2P application for said one or more UEs may be changed;
handling priority of P2P application of traffic for said one or more UEs may be upgraded; and
bandwidth resource provision to P2P application for said one or more UEs may be increased, for example, by disabling compression or transcoding of the P2P application.

With different traffic handling policies generated depending on varying RAN loads, the present disclosure may make the operator monetize network resource flexibly based on the radio network load status.

Under the proposed solutions, the present disclosure may make use of the strength of P2P system while ensuring service availability to other users by considering dynamic RAN status information. For example, in the case that the RAN is light loaded, P2P applications are permitted to make use of the P2P strength. In the case that the RAN is overloaded, P2P applications are restricted or closed to ensure Quality of Experience (QoE) of other users.

It should be noted that FIGS. 3 and 4 are both illustrated in the context of a single type of load that leads to the overload, i.e., there is only one overload indicator informed to the PCRF. However, the similar concept may be applied to any other number of types of load that may simultaneously lead to the overload (there are corresponding number of overload indicators). The only exception lies in the step S450 of FIG. 4. Particularly, if one overload indicated by a first overload indicator disappears and one overload indicated by a second overload indicator newly occurs at the same time, the first and second overload indicators will be sent to the PCRF for use in generating corresponding traffic handling policies in the manners as illustrated by FIGS. 3 and 4, but the step S450 will not be disabled because there is still one overload present.

Although FIGS. 2-4 are illustrated in the context of LTE, it will be appreciated that the technical solutions as described by FIGS. 2-4 may be also applied to any other communication systems such as 3GPP.

Although FIGS. 2-4 are illustrated in the context of P2P applications, it will be appreciated that the technical solutions as described by FIGS. 2-4 may be also applied to any other traffic type, such as VoIP, instant messaging, HTTP based streaming, blog applications, microblog applications, gaming, APP download, social networking applications, etc.

Figure 5:
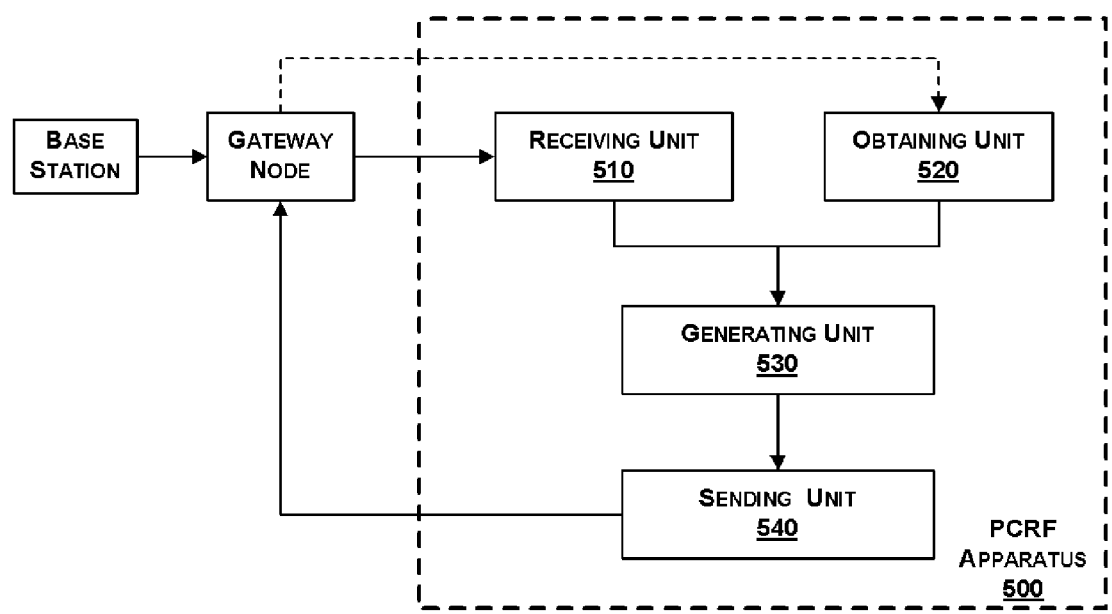
FIG. 5 shows a schematic diagram of a PCRF apparatus 500 for traffic handling according to an embodiment of the present disclosure.

FIG. 5 shows a schematic diagram of a PCRF apparatus 500 of a core network for traffic handling according to an embodiment of the present disclosure.

It should be noted that the PCRF apparatus 500 may be implemented in many different forms of software, firmware and hardware. It may be equivalently used with the PCRF occurring in the foregoing description on FIGS. 1 to 4.

In the following, the PCRF apparatus 500 will be illustrated as involving a hardware structure, however, it will be appreciated that the PCRF apparatus 500 will be also implemented in software or other appropriate forms.

As shown in FIG. 5, the PCRF apparatus 500 may include a receiving unit 510, an obtaining unit 520, a generating unit 530, and a sending unit 540.

The receiving unit 510 is configured to receive information about load status of a RAN area.

As a non-limiting example, the information about load status of the RAN area may come from a base station serving the RAN area and may be forwarded by a gateway node of the core network. For example, the base station may monitor the load status of the RAN area, and upon the change of the load status, report and/or update the information about the load status to the gateway node.

As a non-limiting example, the information about load status of the RAN area may include at least one of: a hardware overload indicator indicating whether RAN hardware is overloaded or not; a TNL overload indicator, which indicates if backhaul connection between the RAN and the core network is overloaded or not; a cell uplink user plane overload indicator indicating if uplink user plane is overloaded or not; a cell downlink user plane overload indicator indicating if downlink user plane is overloaded or not; a cell uplink control plane overload indicator indicating if uplink control plane is overloaded or not; and a cell downlink control plane overload indicator indicating if downlink control plane is overloaded or not.

For example, in LTE, the TNL overload indicator may be a S1 TNL overload indicator, which indicates if backhaul connection between radio access network and core network is overloaded. Alternatively, in 3G network, the TNL overload indicator may be an Iu or Iub TNL overload indicator, which indicates if backhaul connection between radio access network and core network is overloaded or not.

As another non-limiting example, the traffic type may include at least one of: VoIP; instant messaging; HTTP based streaming; blog or microblog application; gaming; APP download; or social networking application. It will be appreciated that the present disclosed may be also applied to any other appropriate traffic types.

The obtaining unit 520 is configured to obtain information about traffic type of one or more UEs associated with the RAN area. Here, the information about traffic type may indicate one or more applications that are running on the one or more UEs.

For example, the information about traffic type may be determined by traffic type detection on the gateway node. For example, the traffic type detection may be enabled always or only when a RAN overload occurs in the RAN area. As such, the traffic type detection may be disabled when it is unnecessary, e.g., when sufficient network resource is available to take any traffic. This may reduce the load of DPI.

The generating unit 530 is configured to generate a traffic handling policy based on the received information about load status of the RAN area and the obtained information about traffic type.

For example, the traffic handling policy may include:
CONDITION: the received information about load status of the RAN area indicates that a RAN overload occurs in the RAN area,
ACTIONS: at least one of:
blocking one or more types of traffic for the one or more UEs;
decreasing a transportation rate (usually, the maximum bit rate) of one or more types of traffic for the one or more UEs;
changing the charging rules applied to one or more types of traffic for the one or more UEs;
degrading handling priority of one or more types of traffic for the one or more UEs; and
decreasing bandwidth resource provision to one or more types of traffic for the one or more UEs, for example, by enabling compression or transcoding mechanism of one or more types of traffic for the one or more UEs.

For example, the base station may detect whether the load status of the RAN area exceeds a predefined threshold so as to determine the "CONDITION". If yes, it is determined that there is a RAN overload occurring, i.e., "CONDITION" is satisfied.

In such a case, for example, the obtaining unit 520 may receive the information about traffic type from the gateway node.

Alternatively, the traffic handling policy may include:
CONDITION: the received information about load status of the RAN area indicates that a RAN overload disappears in the RAN area,
ACTIONS: at least one of:
de-blocking one or more types of traffic for the one or more UEs;
increasing a transportation rate (usually, the maximum bit rate) of one or more types of traffic for the one or more UEs;
changing the charging rules applied to one or more types of traffic for the one or more UEs;
upgrading handling priority of one or more types of traffic for the one or more UEs; and
increasing bandwidth resource requirement of one or more types of traffic for the one or more UEs, for example, by disabling compression or transcoding of one or more types of traffic for the one or more UEs.

For example, after the RAN overload has occurred, the base station may detect whether the load status of the RAN area is lower than a predefined threshold so as to determine the "CONDITION". If yes, it is determined that the RAN overload disappears, that is "CONDITION" is satisfied.

In this case, for example, the obtaining unit 520 may obtain the information about the traffic type, for example, from the previously stored information. For example, the information about the traffic type may be that received from the gateway node when the RAN overload previously occurs.

With different traffic handling policies generated depending on varying RAN loads, the present disclosure may make the operator monetize network resource flexibly based on the radio network load status.

The sending unit 540 is configured to send the traffic handling policy to the gateway node, for applying it to the one or more UEs associated with the RAN area. For example, the sending unit 550 may send the traffic handling policy to the PCEF in the P-GW, which then enforces the traffic handling policy to the one or more UEs associated with the RAN area (or located in the RAN area). For example, the PCEF may perform the P2P traffic handling policy by itself, or may induct the base station to perform the P2P traffic handling policy, depending on the specific traffic requirements.

By generating the traffic handling policy dynamically based on the varying RAN load, the present disclosure can utilize radio network resource more efficiently.

It should be noted that two or more different units in this disclosure may be logically or physically combined. For example, the receiving unit 510 and the sending unit 540 may be combined as one single unit.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described traffic handling scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A traffic handling method for use in a Policy and Charging Rules Function (PCRF) of a core network, comprising:
receiving information about load status of a Radio Access Network (RAN) area, the information about load status including at least one overload indicator providing an indication of whether one or more aspects of the RAN are overloaded, wherein the at least one overload indicator comprises a hardware overload indicator, and wherein:
the information about load status of said RAN area is determined by a base station serving said RAN area based on a comparison of the load status of said RAN area to a predefined threshold; and
the information about load status of said RAN area comes from the base station serving said RAN area and is forwarded by a gateway node in the core network to the PCRF;
obtaining information about traffic type of one or more User Equipments (UEs) associated with said RAN area, the information about traffic type indicating that the one or more UEs associated with said RAN area are running a peer-to-peer application, wherein the information about traffic type is determined by traffic type detection on the gateway node, and the traffic type detection is enabled when a RAN overload occurs in said RAN area and disabled when there is no RAN overload occurring in said RAN area;
generating a peer-to-peer traffic handling policy based on the received information about load status of said RAN area and the obtained information about traffic type;
sending the generated peer-to-peer traffic handling policy to the gateway node in the core network, for applying it to said one or more UEs associated with said RAN area; and
when the received information about load status of said RAN area indicates that a RAN overload occurs in said RAN area, performing at least one of:
changing the charging rules applied to the peer-to-peer application traffic for said one or more UEs; and
degrading handling priority of the peer-to-peer application traffic for said one or more UEs.

2. The traffic handling method according to claim 1, wherein the traffic handling policy further comprises:
when the received information about load status of said RAN area indicates that a RAN overload occurs in said RAN area, performing at least one of:
blocking the peer-to-peer application for said one or more UEs;
decreasing a transportation rate of the peer-to-peer application traffic for said one or more UEs; and
decreasing bandwidth resource provision to the peer-to-peer application traffic for said one or more UEs.

3. The traffic handling method according to claim 1, wherein the traffic handling policy comprises:
when the received information about load status of said RAN area indicates that a RAN overload disappears in said RAN area, performing at least one of:
de-blocking the peer-to-peer application for said one or more UEs;
increasing a transportation rate of the peer-to-peer application traffic for said one or more UEs;

changing the charging rules applied to the peer-to-peer application traffic for said one or more UEs;

upgrading handling priority of the peer-to-peer application traffic for said one or more UEs; and increasing bandwidth resource provision to the peer-to-peer application traffic for said one or more UEs.

4. The traffic handling method according to claim 1, wherein the at least one overload indicator further comprises at least one of:

a Transport Network Layer (TNL) overload indicator, which indicates if backhaul connection between the RAN and the core network is overloaded or not;

a cell uplink user plane overload indicator;

a cell downlink user plane overload indicator;

a cell uplink control plane overload indicator; and a cell downlink control plane overload indicator.

5. The traffic handling method according to claim 1, wherein the information about traffic type further comprises information about at least one of:

Voice over IP (VoIP);

instant messaging;

Hypertext Transfer Protocol (HTTP) based streaming;

blog application;

microblog application;

gaming;

APP (APPlication) download; and social networking application.

6. A Policy and Charging Rules Function (PCRF) apparatus of a core network for traffic handling, comprising:

a receiver;

a transmitter; and one or more processors coupled to the receiver and the transmitter, the one or more processors configured to:

receive information about load status of a Radio Access Network (RAN) area, the information about load status including at least one overload indicator providing an indication of whether one or more aspects of the RAN are overloaded, wherein the at least one overload indicator comprises a hardware overload indicator, and wherein:

the information about load status of said RAN area is determined by a base station serving said RAN area based on a comparison of the load status of said RAN area to a predefined threshold; and the information about load status of said RAN area comes from the base station serving said RAN area and is forwarded by a gateway node in the core network to the PCRF;

obtain information about traffic type of one or more User Equipments (UEs) associated with said RAN area, the information about traffic type indicating that the one or more UEs associated with said RAN area are running a peer-to-peer application, wherein the information about traffic type is determined by traffic type detection on the gateway node, and the traffic type detection is enabled when a RAN overload occurs in said RAN area and disabled when there is no RAN overload occurring in said RAN area;

generate a peer-to-peer traffic handling policy based on the received information about load status of said RAN area and the obtained information about traffic type;

send the generated peer-to-peer traffic handling policy to the gateway node in the core network, for applying it to said one or more UEs associated with said RAN area; and when the received information about load status of said RAN area indicates that a RAN overload occurs in said RAN area, perform at least one of:

change the charging rules applied to the peer-to-peer application traffic for said one or more UEs; and degrade handling priority of the peer-to-peer application traffic for said one or more UEs.

7. The PCRF apparatus according to claim 6, wherein the traffic handling policy further comprises:

when the received information about load status of said RAN area indicates that a RAN overload occurs in said RAN area, performing at least one of:

blocking the peer-to-peer application for said one or more UEs;

decreasing a transportation rate of the peer-to-peer application traffic for said one or more UEs; and decreasing bandwidth resource provision to the peer-to-peer application traffic for said one or more UEs.

8. The PCRF apparatus according to claim 6, wherein the traffic handling policy comprises:

when the received information about load status of said RAN area indicates that a RAN overload disappears in said RAN area, performing at least one of:

de-blocking the peer-to-peer application for said one or more UEs;

increasing a transportation rate of the peer-to-peer application traffic for said one or more UEs;

changing the charging rules applied to the peer-to-peer application traffic for said one or more UEs;

upgrading handling priority of the peer-to-peer application traffic for said one or more UEs; and increasing bandwidth resource provision to the peer-to-peer application traffic for said one or more UEs.

9. The PCRF apparatus according to claim 6, wherein the at least one overload indicator further comprises at least one of:

a Transport Network Layer (TNL) overload indicator, which indicates if backhaul connection between the RAN and the core network is overloaded or not;

a cell uplink user plane overload indicator;

a cell downlink user plane overload indicator;

a cell uplink control plane overload indicator; and a cell downlink control plane overload indicator.

10. The PCRF apparatus according to claim 6, wherein the information about traffic type further comprises information about at least one of:

Voice over IP (VoIP);

instant messaging;

Hypertext Transfer Protocol (HTTP) based streaming;

blog application;

microblog application;

gaming;

APP (APPlication) download; and social networking application.

* * * * *